H. T. MURPHY.
FREIGHT CAR.
APPLICATION FILED APR. 10, 1920.
1,347,174.  Patented July 20, 1920.
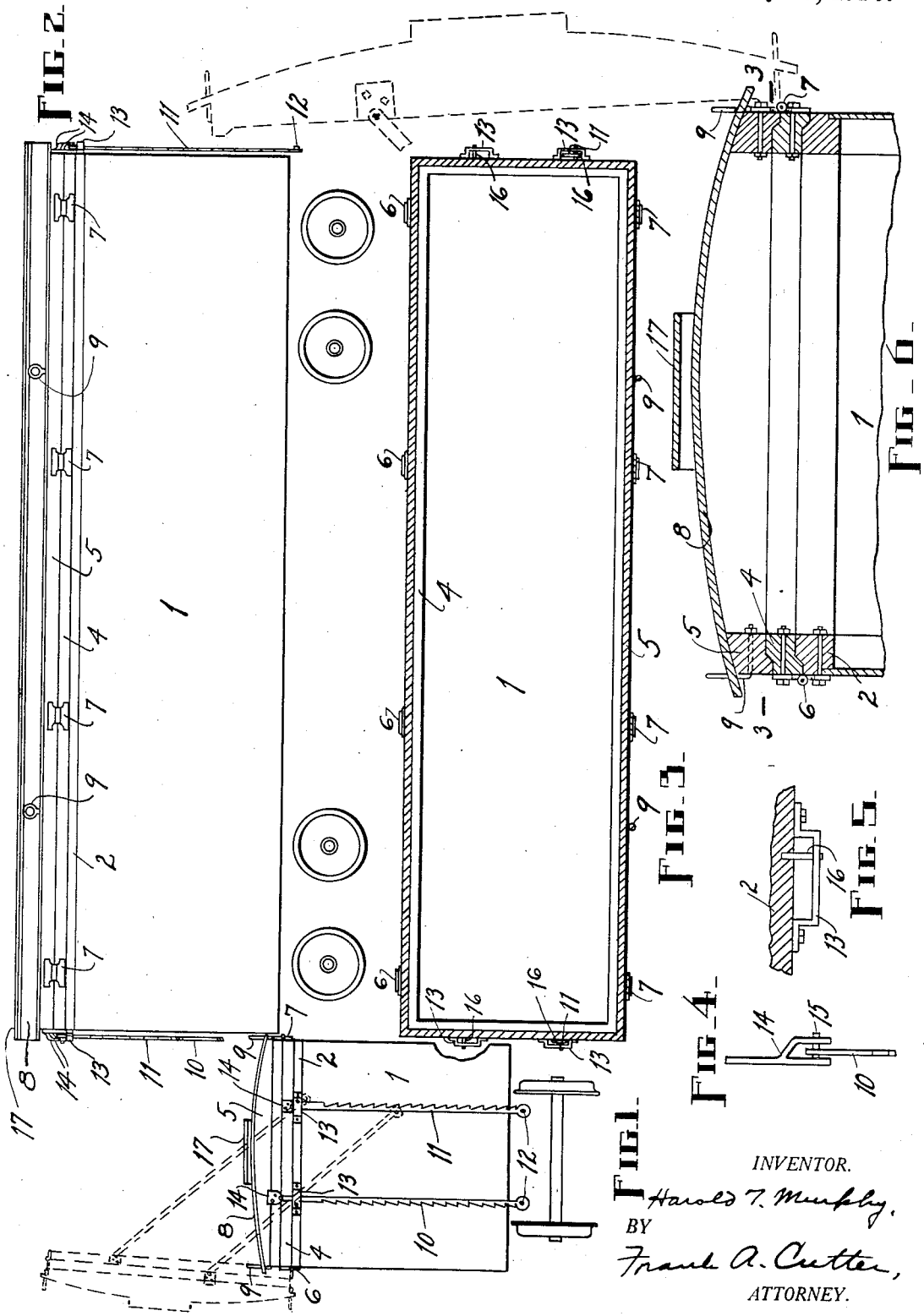
INVENTOR.
Harold T. Murphy.
BY
Frank A. Cutter,
ATTORNEY.

UNITED STATES PATENT OFFICE.

HAROLD T. MURPHY, OF SPRINGFIELD, MASSACHUSETTS.

FREIGHT-CAR.

1,347,174.　　　Specification of Letters Patent.　　Patented July 20, 1920.

Application filed April 10, 1920. Serial No. 372,935.

*To all whom it may concern:*

Be it known that I, HAROLD T. MURPHY, a citizen of the United States of America, and a resident of Springfield, in the county of Hampden and State of Massachusetts, have invented a new and useful Freight-Car, of which the following is a specification.

My invention relates to improvements in freight cars of the box-car type, and more particularly to the roofs of such cars, and resides in a freight-car roof which can be opened bodily so as to permit of the loading and unloading of the car through the top, the construction and arrangement of the parts being such, preferably, that said roof is capable of being swung upwardly or opened from either side, all as hereinafter set forth.

The advantage of loading and unloading a freight car through the top instead of through a door in one or both sides, especially when the freight consists of heavy machinery, articles too large for the doors, and the like, or when it is desired to load the car to the roof with freight of almost any character, is obvious, and the primary object of my invention is to provide means whereby the roof of the car may be swung upwardly or opened throughout its entire extent and thus removed as an obstacle to the introduction of freight into the car from above and the removal of said freight through the top of the car, such means being simple both structurally and functionally and comparatively inexpensive, and greatly facilitating the loading and unloading operations, and even increasing the carrying or at least the loading capacity of the car. Thus a large amount of time is saved, and the value of the car for freight-carrying purposes materially enhanced. For machines and other large and bulky freight a crane or other hoisting apparatus is usually required, and this can be most advantageously employed with a car equipped with my roof.

Cars having doors or equivalent members in their roofs have been devised, but such contrivances possess little advantage over side doors, and frequently are of no advantage whatever, because the greater portion of the roof, in any such case, is fixed in place and prevents the introduction of freight which is too large to pass through the opening in the top or roof of the car, although not too large to be received in said car.

For a car of ordinary length, and, in fact, for most cars whether long or short, it is preferable that my roof extend the entire length of the car without being divided transversely into sections.

Another object is to provide a roof of the character set forth which is applicable or adaptable to old as well as new cars.

Although I have illustrated my invention in connection with a wooden box car, it is just as applicable to a steel box car.

Other objects and advantages will appear in the course of the following description.

I attain the objects and secure the advantages of my invention by means illustrated in the accompanying drawings, in which—

Figure 1 is an end elevation of a freight box car equipped with a practical form of my invention, the roof being shown closed in full lines, and open by broken lines, Fig. 2, a side elevation of said car, said roof being closed; Fig. 3, a horizontal section through the roof portion of the car, taken on lines 3—3, looking down, in Fig. 6; Fig. 4, an enlarged detail in side elevation of one of the connections for the braces which are provided to retain the roof in elevated or open position; Fig. 5, an enlarged detail in top plan of one of the keepers for said braces, and, Fig. 6, an enlarged detail in vertical, transverse section of the upper portion of the car and of the roof, the latter being shown closed, in full lines, and open, on the side opposite to that upon which the roof is represented as being open in the first view, by broken lines.

Similar reference numerals designate similar parts throughout the several views.

A body of a freight box car is represented at 1. On all four sides of the car body 1, on the inside and at the top, is an ordinary ledge or frame 2, said sides and frame being permanently and rigidly connected with each other. Mounted on the fixed frame 2 is a movable frame 4, and mounted on the latter is a movable frame 5. The frame 4 is hinged at 6 to the frame 2 on one side, and the frame 5 is hinged at 7 to said frame 4 on the opposite side. The frame 5 directly supports and carries a roof 8, and may be said to form part of such roof.

Obviously the roof 8 with its frame 5 can be swung upwardly on the hinges 7, leaving the frame 4 in place on the frame 2, as represented in Fig. 6, so that access to the car body 1 is had through said frames 4 and 2, on the one hand, or said roof with its frame and said frame 4 can be swung upwardly on the hinges 6, as represented in Fig. 1, so that access to said body is had through said frame 2, on the other hand. Thus the top of the body can be opened from either side, which is an important advantage, because it is necessary sometimes to load or unload the car from one side and sometimes from the other side.

Eye-bolts 9 may be provided on each side of the roof to afford convenient attaching means for hoisting mechanism or members which may be required or utilized in opening and closing said roof.

Usually some means should be provided for holding or supporting the roof in place after being opened, and for preventing said roof from being swung outwardly beyond the wide-open position, and to this end I may employ serrated braces or rods 10 and 11 having pins 12 at their lower ends, and a keeper 13 for each of said rods. The rod 10 has its upper terminal pivotally attached at 15 to a bifurcated lug 14 secured to one end of the frame 5, and one of the keepers 13 is secured to the corresponding end of the frame 2 directly below said lug, when the roof is down in closed position; and the rod 11 has its upper terminal similarly attached to a similar lug secured to the corresponding end of the frame 4. The second keeper 13, is, of course, directly below the second lug 15, when the roof is in closed position, and on the same end of the frame 2 with the first keeper. The serrations or teeth of the rods 10 and 11 are on the outer edges of said rods, and each keeper 13 is provided with a transverse pin 16, in lieu of a tooth, with which the teeth on the rod that passes through said keeper are adapted to engage, such pin passing through the front or outer side portion of said keeper into the adjacent side of the end of the frame 2 to which said keeper is secured. The pins 12 project outwardly from the front sides or outer faces of the rods 10 and 11 at the bottom, and are of sufficient length to engage the bottom edges of the keepers 13, when said rods arrive at the limit of their upward travel, and prevent the withdrawal of said rods from said keepers, so that the roof cannot be thrown over too far during the opening operation. It is understood that the rods 10 and 11 move up and down behind or within the keepers 13.

When the roof is swung upwardly on the hinges 7, the rod 10 is drawn up in its keeper 13 until the pin 12, with which said rod is provided, encounters said keeper, when the lowermost tooth on said rod is caused to engage the pin 16 which forms a part of said keeper. The roof is now held in its wide-open position, and so remains until the rod 10 is moved to bring about its disengagement from the aforesaid pin, when said roof is or can be swung downwardly into closed position again. If it be desired only partially to open the roof from the same side as before, some intermediate tooth on the rod 10 is caused to engage the associated pin 16. Likewise, when the roof is opened on the hinges 6, the rod 11 with its keeper is employed to hold said roof in raised position, either wide open or only partially open, and said rod is manipulated to release the same from said keeper for the purpose of unfastening the roof to permit it to be closed. The pin 12, with which the rod 11 is provided, serves a similar purpose to that of the pin 12, with which the rod 10 is provided. The spaces within the keepers 13 are of sufficient length to allow for the movement or play necessary in the locking and releasing operations. The rod 10 moves up in its keeper, when the roof is opened on the hinges 6, but does not necessarily perform any function at that time.

The rods 10 and 11 and the keepers 13 may be provided at either or both ends of the car body.

The roof member 8 may have the customary running-board 17 thereon, and may in other respects be similar to any ordinary freight box car roof.

I prefer to break the joints between the several frames, as shown in Fig. 6, so as to render the same water-tight.

From the foregoing it is plainly to be seen how a car equipped with a roof, such as I have hereinbefore described in detail, can be loaded and unloaded from either side to the best advantage and in a short period of time, provided a suitable crane or hoisting apparatus be employed. As soon as the roof is opened, it does not matter from which side, the entire top of the car or car body is left free and clear for the work to be done with the aid of the hoisting mechanism, but when said roof is again lowered said body is tightly and securely closed and the car has the appearance of an ordinary car and to all intents and purposes is the same as an ordinary car.

More or less change in matters of detail may be made in my invention without departing from the spirit thereof or exceeding the scope of what is claimed.

What I claim as my invention, and desire to secure by Letters Patent, is—

1. In a car, a body, a roof, an intervening member, and oppositely-disposed articulating means on different levels for said member and body and said member and roof.

2. In a car, a body, a frame articulated to said body on one side, and a roof separable from but articulated to said frame on the other side.

3. In a car, a body, a frame articulated to said body on one side, a roof separable from but articulated to said frame on the other side, and supporting means for said roof when independently elevated and for said roof and frame when elevated together.

4. In a car, a body, a frame mounted on said body, a roof mounted on but separable from said frame, and means pivotally to connect such members on opposite sides of the car at different elevations.

5. The combination, in a car, with a body, and a roof, of an intervening member open in the center, and oppositely-disposed articulating means between said member and said body and roof, whereby the latter may be swung upwardly on said member in one direction, or may be swung upwardly with said member in the other direction.

HAROLD T. MURPHY.

Witnesses:
A. C. FAIRBANKS,
F. A. CUTTER.